United States Patent

McNeil et al.

[11] Patent Number: 5,838,769
[45] Date of Patent: Nov. 17, 1998

[54] METHOD OF REDUCING RISK THAT CALLS ARE BLOCKED BY EGRESS SWITCH OR TRUNK FAILURES

[75] Inventors: Howard McNeil, Allen, Tex.; Donald Pitchford, Campbell, Calif.; Iyad S. Tarazi, Reston, Va.

[73] Assignee: MCI Communications Corporation, Washington, D.C.

[21] Appl. No.: 775,764

[22] Filed: Dec. 31, 1996

[51] Int. Cl.$^6$ .............................. H04M 1/24; H04M 3/08; H04M 3/22

[52] U.S. Cl. ............................. 379/14; 379/134; 379/220; 379/221; 379/224

[58] Field of Search ....................................... 379/111, 112, 379/113, 115, 133, 134, 138, 220, 221, 224, 207, 219, 229, 1, 9, 10, 14, 15, 16, 17, 23, 34; 370/248, 250

[56] References Cited

U.S. PATENT DOCUMENTS

| | | |
|---|---|---|
| 4,284,852 | 8/1981 | Szybicki et al. . |
| 5,311,585 | 5/1994 | Armstrong et al. .................... 379/134 |
| 5,375,167 | 12/1994 | Bales et al. .............................. 379/224 |
| 5,377,262 | 12/1994 | Bales et al. .............................. 379/224 |
| 5,526,414 | 6/1996 | Bedard et al. ........................... 379/220 |
| 5,537,392 | 7/1996 | Wille et al. .............................. 370/248 |
| 5,544,154 | 8/1996 | Glitho .................................... 370/248 |
| 5,583,848 | 12/1996 | Glitho .................................... 370/248 |

*Primary Examiner*—Curtis A. Kuntz
*Assistant Examiner*—Binh K. Tieu

[57] ABSTRACT

The instant invention provides a number of approaches in which a virtual homing to overcome outages can be achieved whereby a single terminating destination or an egress node can be formed from multiple terminating switches that would allow the network to route calls based on the capacity, economics or survivability of those switches to accept the call. A first network processor (NP) approach includes a number of methods that relies on the processor of the dynamic control routing (DCR) network, and the switch based routing that directs a call to the appropriate terminating node. A second approach of the instant invention is based on the data access point (DAP) of the network. This DAP approach utilizes the intelligence of the network and requires that all call queries be directed to the DAP for locating the appropriate terminating switch for routing the call.

18 Claims, 14 Drawing Sheets

NP Approach —IMT Call Flow

Method 1 Call Flow

Method 1 Release with Cause

Method 2 Call Flow

Method 2 Release with Cause

Method 3 Call Flow

METHOD OF REDUCING RISK THAT CALLS ARE BLOCKED BY EGRESS SWITCH OR TRUNK FAILURES

FIELD OF THE INVENTION

The present invention relates to the routing of calls in a telecommunications network and more specifically to the various approaches that can be taken to overcome, or at the very least reduce the risk, that calls are blocked from being routed to their destinations, by outages occurring at the egress switches or trunks of the telecommunications network.

BACKGROUND OF THE INVENTION

A long range objective of any telecommunications network is to become independent from outages. To achieve this goal, techniques such as access diversity, dynamic control routing (DCR) and real time restoration (RTR) are used. However, in the present date inter-exchange (IXC) environment where traffic terminating to off network locations has traditionally been served by a terminating, or gateway switch, any failures or outages at the terminating facilities or switches can leave the telecommunications network vulnerable. Currently, for telecommunications network such as the MCI network, a wide area telecommunications service (WATS) has been relied upon to protect the terminating traffic against switch and trunk or fiber failures. But such WATS circuits are only sized to support 20% of the non-dedicated access line (DAL) terminating traffic. This is a far cry from the network being immune from switch or trunk failures.

BRIEF DESCRIPTION OF THE PRESENT INVENTION

In order to protect terminating traffic against switch and/or trunk fiber failures in the terminating switches or nodes of a network as a call is routed to a local access and transport area (LATA) or a local telephone company (TELCO), a tough design network objective is needed. One such design objective is as follows. For a single network outage event, i.e. switch failure or fiber cut, the blockage should be less than 20% of the busy hour traffic from and to any LATA; the failure should be completely transparent if it occurs when the network traffic level is less than 80% of the busy hour; and the blockage should be less than 67% of any dedicated access line (DAL) groups' busy hour traffic if the DAL group is comprised of more than three T1 lines.

Given that the egress network is single threaded at the switch sites, the network becomes very vulnerable to outages. With the above-noted design objective in mind, note that egress diversity is not just simply putting terminating facilities onto multiple switches. Rather, the terminating facilities must be recognized by the originating switch or node so that calls can be routed to the proper destination based on network conditions. Given that every network, including a DCR network, is designed with the philosophy that a call can have only one exit point, adding additional terminating facilities without proper switch and system development will affect network performances that may leave much of the facilities unused.

To overcome this, the concept of virtual homing is effected in the instant invention system. For the instant invention, virtual homing is defined as the ability to home a single destination onto multiple switches, which in turn allows the network to route calls to a destination based on capacity, economics or survivability objectives. The logical grouping of switches and egress trunks for a given destination is referred to as an egress node. Egress nodes also have some extended attributes one of which is that the egress nodes can be communicating or non-communicating. A communicating egress node monitors the entire path, while a non-communicating egress node monitors only the inter-machine trunk (IMT) portion of the call, i.e. a DCR virtual node. Given that a egress node comprises a number of switches such as for example automatic call distributor (ACD) switches, virtual homing will allow calls to be routed to the least busy operator centers, thereby increasing the grade of service for the customer and at the same time achieving automatic load balancing of the network.

The instant invention virtual homing method can be implemented in a number of ways, including three basic approaches which, for the instant invention, are referred to as network processor (NP), data access point (DAP) and sequential. Each of these approaches can further be implemented in a number of ways. But irrespective of the method, the basic criteria are the following: (1) each method protects the egress network by allowing overflow to a different switch; and (2) each method dynamically load balances multiple homed tandem switches.

The NP approach relies on the DCR network processor (NP) and switch based routing to terminate to the appropriate terminating node. The traffic is divided using percent allocation to the different switches that make up the serving area. Such percent allocation can be either dynamic or static. For a dynamic serving area, the percent allocation is updated automatically by the NP, which monitors the egress network and updates the capacity of the various switches for carrying traffic. For the static type of percent allocation, the serving area is updated via a manual process. This is because the NP does not monitor the egress circuits or the switches are non-communicating.

There are two basic methods to the NP approach for the instant invention. These are the so-called full or classic NP method and an exception method. These methods can in turn incorporate a so-called leaky bucket approach in which an algorithm is used for determining the specific allocation of traffic among the various terminating switches. For the classic NP approach, the incoming call traffic is allocated among each of the direct IMTs that connect the originating or origination node to the terminating switches that define the egress node. If all of the direct IMTs are busy, a best tandem switch is selected for routing the traffic. At the tandem switch, the traffic is randomly distributed to the terminating switches of the egress node via the direct IMTs that connect the tandem switch to those terminating switches. The traffic from the egress node is then routed to the destination switch, which may well be outside of the network, by means of trunks or lines that connect the terminating switches in the egress node to the destination switch. If, for any reason, calls cannot be completed on the trunk group that connects the egress node to the destination, the calls are released back to the egress node so that different trunks, or a trunk group, that connect the terminating switches of the egress node to the destination may be used. And if all of the trunk groups that connect the virtual node to the destination are busy, then the originating node will determine a different destination to which the call traffic is to be routed.

The way in which calls are allocated and routed to a particular switch is defined by the above-noted leaky bucket algorithm.

For the NP exception method, the call traffic from the originating switch needs to be routed to a first terminating switch. This oftentimes is due to economics associated with such terminating switch. At such terminating switch, an attempt is made to route the call traffic directly, by means of a trunk that connects that terminating switch to the destination. If that trunk is busy, the call traffic is routed, via a different trunk to a tandem switch, which in turn reroutes the call traffic to the destination. If the call cannot be rerouted, then it is released back to the originating switch, which will overflow the call into an exception routing by selecting a different terminating switch, or another virtual node. The same process is repeated in attempting to route the call to the destination. If the call fails to be completed with the alternate terminating switch, it is released back to the originating switch which will send the call to a wide area telecommunications service (WATS) for routing to the destination.

For the DAP approach, the network is turned into an intelligent network (IN). For every incoming call to the network, a call query is sent to the data access point (DAP) to find its destination. By adding logic to the destination selection and interfacing the NP to the DAP, the DAP can make recommendations based on the network conditions. This IN approach takes the intelligence out of the various switches and puts it into the DAP, while at the same time reducing the demand for specific switch development. There are three methods to the DAP approach.

The first DAP method makes the network fully intelligent. For every call, there is a DAP query. And if the terminating switch and/or trunk fails, the call is released back to the originating switch and another query is sent to the DAP, until the call is completed or until the DAP runs out of route choices. The second DAP method gives each call all of the different possible route choices it needs in a list, thereby reducing the number of transactions on the DAP. The third DAP method allows the call to be routed to its primary destination. If it fails, the call is released back and a DAP query is performed for an alternate destination. This third DAP method also reduces the load on the DAP and the connecting links.

Another approach that may be taken is the sequential routing. Here, the NP will deliver the call to the destination based on NP recommendations and switch routing tables. If the call fails to complete at the egress switches, the call is routed via an IMT from the old terminating switch to a new terminating switch. This sequential method tends to increase the IMT sizes between the serving area's switches and add the risk of possible round robin situations among the switches.

Using any of the above noted methods, the present invention is able to accomplish the objective of reducing the risk that a call cannot be completed from an originating switch to a destination because there is an outage at the terminating switch to which the call supposedly is to be routed.

It is another objective the present invention to provide a method of optimally allocating the percentage of calls to route to a particular switch defined in a serving area so that call traffic is spread among the various terminating switches of a virtual node without any of the terminating switches being overloaded.

BRIEF DESCRIPTION OF THE FIGURES

The above-mentioned objectives and advantages of the present invention will become more apparent and the invention itself will be best understood by reference to the following description of the invention taken in conjunction with the accompanying drawings, wherein.

DETAILED DESCRIPTION OF THE PRESENT INVENTION

Figure 1:
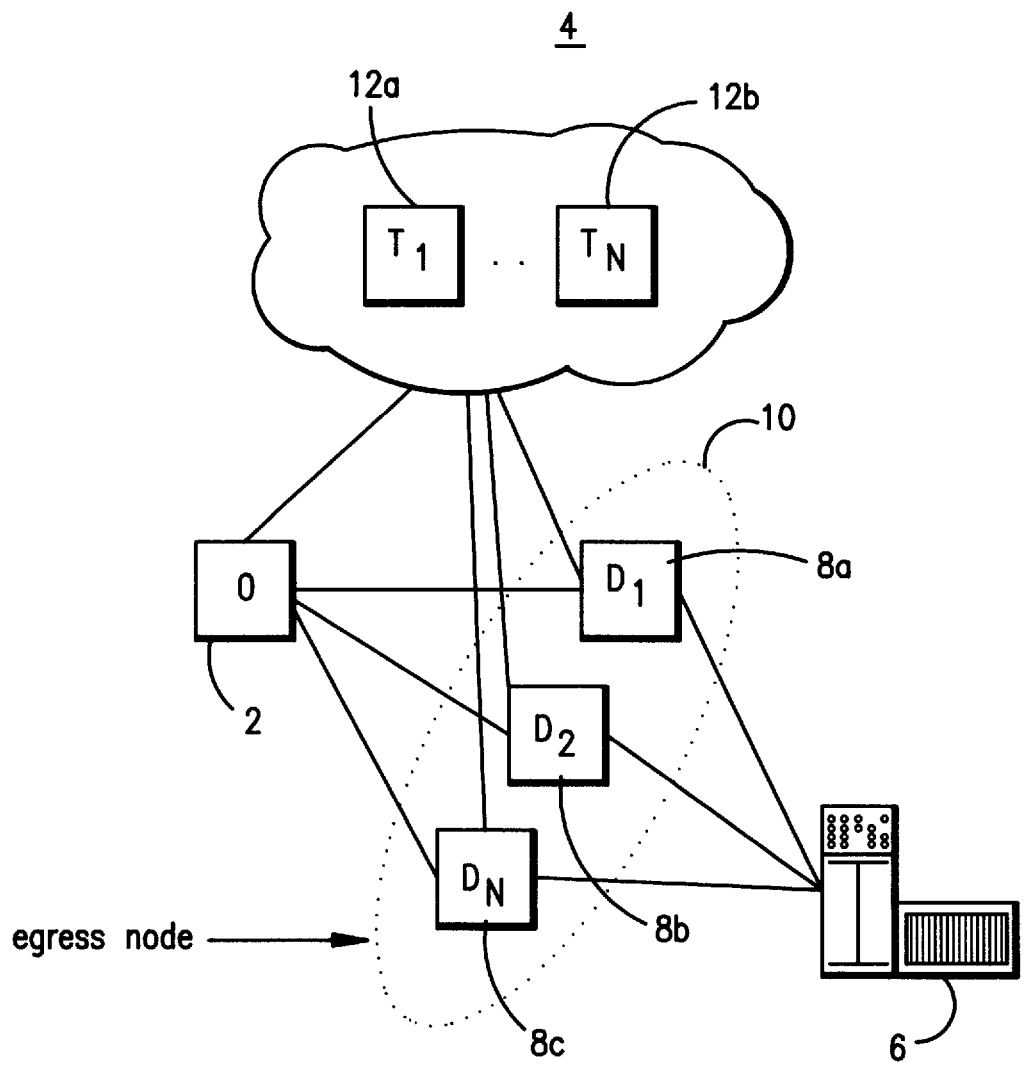
FIG. 1 illustrates an egress node as being a logical grouping of DCR switches, either communicating or non-communicating.

With reference to FIG. 1, an overall view of virtual homing, as the focus of the dynamic control routing (DCR) network of the instant invention is provided. The objective of course is to support reliable delivery of calls from their origin or originating switch to their destination or terminating switch within the network. Calls are routed between the physical origination and destination switches. However, many of the calls are not required to be delivered to a single physical destination switch. Instead, these calls are required to be delivered only to a point where they can be served or where they can progress further towards completion. Such points are often not unique within a network. For example, toll service (1+) operator services and 800 special service calls are all examples of services that can be served by multiple service destinations.

In order to limit the number of destinations to be handled, traditional routing schemes use the concept of unique exit points to associate an "intermediate destination" with each "final" destination. Thus, a final destination may represent the final delivery point for a certain class of calls, a physical switch in a foreign network, or a service processing engine to which the call receives proper treatment. In FIG. 1, for the current routing methodology, a call originates at origination node 2 of the DCR network 4 and supposedly is destined for destination 6. For this example, destination 6 is presumed to be outside of DCR network 4 and associated with a specific "gateway" or termination switch such as 8b. Thus, DCR network 4 associates switch 8b to be the intermediate destination for the call and attempts to deliver the call thereto from originating switch 2. Therefore, if the call cannot be delivered to switch 8b, it is prevented from reaching its final destination 6. Note that switch 8b is a critical point in the path from originating switch 2 to destination 6 because of the operational processes that define it as such. However, switches 8a and 8c could also be used to reach destination 6. Therefore, the call from originating switch 2 could also be routed to either of switches 8a or 8c for rerouting to destination 6.

Some networks support means eliminate intermediate destinations as critical points for selected services. This applies, for instance, to virtual networking and automatic call distributor (ACD) services. The systems that support these services can detect congestion in service delivery points and can redirect calls to alternate points. However, these systems typically are applicable only to specific overlay networks, thereby making widespread deployment expensive. Moreover, those systems are not dynamic and typically work in a trial and error mode, which entails call set-up delays.

The egress node concept of the instant invention is an enhancement to DCR network 4 which enables multiple physical switches, for example switches 8a–8c, to be defined as a single logical destination. From the viewpoint of routing, such an egress node still represents only one gateway to a particular service, but that gateway now consists of multiple physical switches. With reference to FIG. 1, the egress node is represented by switches 8a, 8b and 8c and the trunks connecting them with destination 6, as encircled by the dotted line and designated 10. For the instant invention, therefore, an egress node is a communicating DCR node with the following characteristics: it sends "congestion data" to the NP; it cannot be used as a DCR tandem node; it does not receive recommendations from the NP; it consists of one or more components which are usually physical switches and egress trunks but can also include other logical components (for example virtual nodes can be made up of other virtual nodes); and it cannot be used as a DCR origination node.

In FIG. 1, having defined switches 8a–8c as residing in egress node 10 when a call is output from origination node 2, direct trunks/links connect origination node 2 to egress node 10. If the trunk(s) connecting origination node 2 to egress node 10 is busy, a two-link route that routes the call first to a tandem node such as 12a and then to egress 10 is effected. Given for a egress node, the intra-link traffic allocation among the switches is important because of the distribution of the load on those switches. Therefore, for egress node 10, the NP produces a recommendation that selects the links toward egress node 10. This recommendation depends on the congestion data it receives from the egress node, i.e. from the actual physical switches within the egress node. Each of the switches, or nodes, within the egress node reports two sets of data to the NP. The first set is the normal congestion data that the node sends to the NP as a part of its operation as a communicating node of the DCR network. The second set of data is that which is generated as a result of the node being a member of the egress node. These two sets of data are bundled together and sent to the NP once every update cycle.

It should be recognized that the egress node congestion data is different for different applications. By introducing the generic measurement of resource "idleness", egress nodes can be developed as generic based on which custom application is built. Take for example the destination 6 in FIG. 1. Assuming that it is a switch outside the DCR network, the egress node 10 will report the idleness of the trunks connecting it to destination 6. If destination 6 is a pool of operators, then egress node 10 reports the number of idle operators. The NP could then use this information to make recommendations to all connected traffic routers on how to spread the traffic among the various links. The recommendations are dynamically adjusted every update cycle to account for the changing traffic patterns at the egress nodes.

In addition to being classified as communicating, egress nodes can also be classified as static. A static egress node provides the same characteristics as a communicating egress node but without providing congestion data to the NP during update cycles. The static egress node by nature will provide the same random distribution regardless of the network conditions. Such nodes require far less CPU processing at NP than communicating egress nodes. Another main characteristic of a static egress node is that the physical elements do not have to be communicating with the NP. A static egress node accordingly has the following characteristics: it does not send congestion data to the NP; it cannot be used as a DCR tandem node; it does not receive recommendations from the NP; it consists of one or more components which are usually physical switches but can also include other logical components, such as for example, other egress nodes; it cannot be used as a DCR origination node; and the nodes within the static egress node can be either communicating or non-communicating.

A DCR network, for example such as the MCI network, is configured with many different types of egress networks which may comprise an egress node. The egress network includes share feature groups, automatic call distributor (ACD), terminating dedicated access line (DAL) and international trunks, etc. The share egress network may consist of the feature group A (FGA), B, C and D that are primary sources for dial-1 customers. Such a network is very large and may have a large quantity, for example over 900, tandem trunk groups and a large number of direct trunks. The network further has a large number of nodes. For the instant invention, a node is a logical representation of one or more physical switches and egress trunks grouped together to form a termination of the network, for example an egress location such as egress node 10 shown in FIG. 1. In DCR, every switch is represented by at least one node. The switch, or node, can either be communicating or non-communicating. As was mentioned before, a communicating node receives recommendation from the NP.

Figure 2:
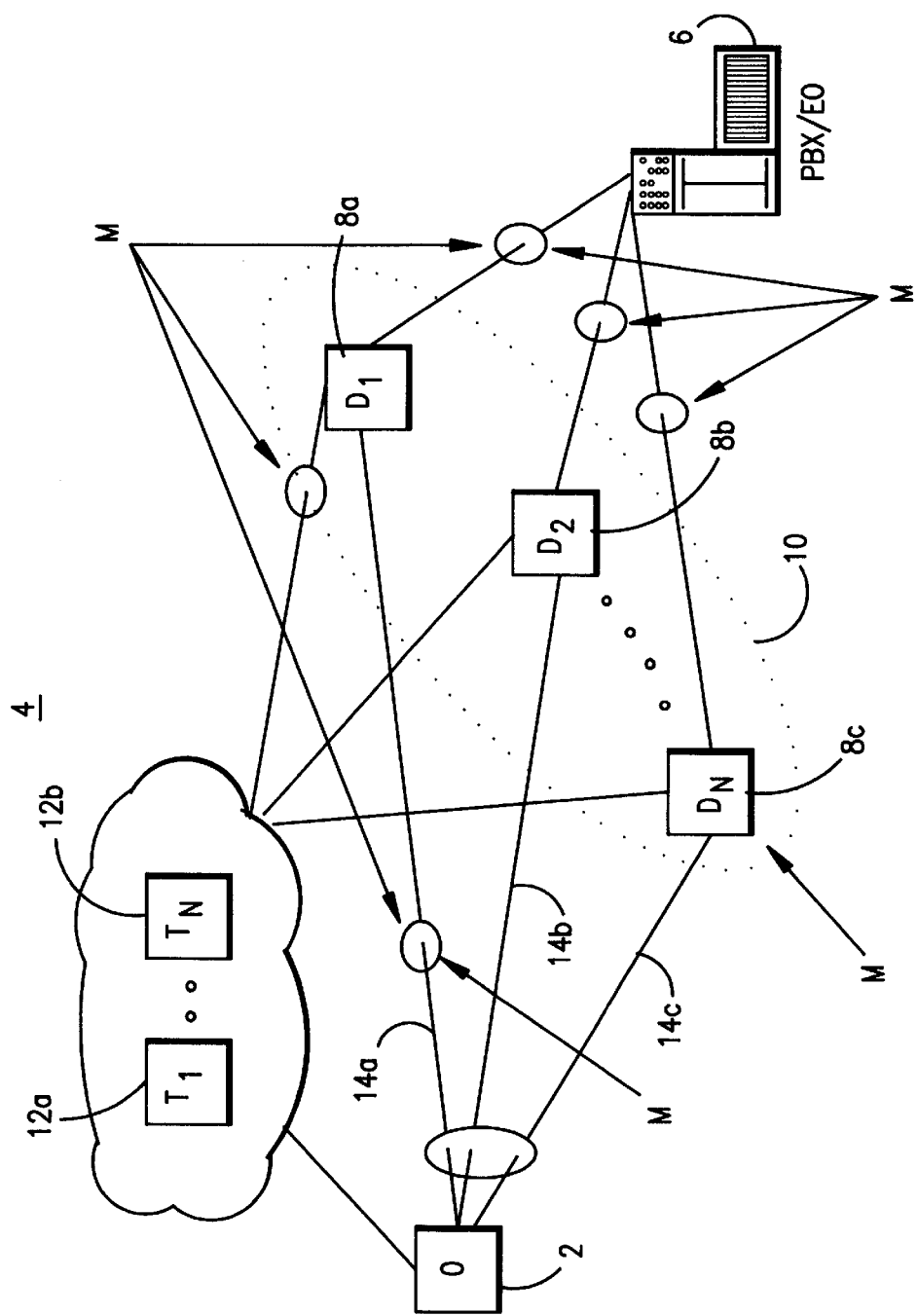
FIG. 2 is an illustration used to explain the dynamic and static virtual homing concepts.

With reference to FIG. 2, the dynamic and static virtual homing concepts are illustrated. Currently with DCR, the traffic being routed from the original node to the destination has no knowledge of how it is to be distributed onto the links or trunks between the origination node and the destination. This distribution is important under the virtual homing concept because the traffic from the origination node or switch will need to be distributed onto each of the links or trunks that connects to the egress node. And DCR needs to know how the traffic is being allocated in order to spread the traffic fairly among the components of the egress node and the links in the trunk that connects the origination node to the egress node.

To allocate traffic to each element of the egress node, DCR uses percent allocation. Since the connection from the origination node to the destination is made of several components, it is necessary to compute the status of the entire path. With reference to FIG. 2, the components that make up the entire path are the trunks that connect origination node to egress node 10, for example trunks 14a, 14b and 14c. Note that each of the trunks may be equated with a bundle of links. Other components that make up the entire path include of course the origination node 2 and the switches 8a, 8b and 8c that made up egress node 10. Given that egress node 10 is the point where calls are output from the DCR network to the destination, such as for example, the PBX or the end office of destination 6, egress node 10 may be considered as the egress point and each of switches 8a, 8b and 8c may be considered as an egress switch.

Further with respect to FIG. 2, each of trunks 14a, 14b and 14c may be considered as an individual inter-machine trunk (IMT) that connects origination node 2 to switches 8a, 8b and 8c, respectively, of egress node 10. Further note that albeit only three switches are shown in egress node 10, in actuality a greater or smaller number of switches may in fact be resident in each egress node in DCR network 4.

In computing the random distribution for the virtual node, the status of each component is combined to give an overall proportion between the origination node 2 and the destination 6. The status of each component, and trunk, accordingly is monitored, as for example illustrated by the arrows shown in FIG. 2 by the network processor of DCR network 4. The monitoring is represented by M in FIG. 2.

With the appropriate monitoring of the components of the network, the overall proportions for distributing the incoming call traffic are calculated. The call traffic is then distributed to the various network elements during each update cycle of the network processor. For example, the FIG. 2 network may distribute 50% of the call traffic from origination node 2 to terminating switch 8a, 30% to terminating switch 8b, and 20% to terminating switch 8c. Thus, when a call originates from origination node 2 and is destined for destination 6, the above-noted percentages are used with a random distribution algorithm to select any one of trunks 14a, 14b and 14c for sending the call to terminating switches 8a, 8b and 8c, respectively. Putting it differently, 1 of every 5 calls destined for destination 6 will be routed from origination node 2 to terminating switch 8c, approximately 1 out of every 3 calls will be routed from origination node 2 to terminating switch 8b, while 1 out of every 2 calls will be routed from origination node 2 to terminating switch 8a. Thus, calls are distributed based on dynamic percent allocation for dynamic virtual homing. Any calls directed to a trunk that is busy or blocked are released back to origination switch 2 so that another choice is made.

Static allocation of incoming calls is the same as dynamic allocation with the exception that the random distribution is not dynamically updated by the network processor. In other words, incoming calls are distributed to the IMTs based on a fixed percent allocation, until the percentages are manually changed. Thus, if a network event occurs that affects the capacity of the network, and specifically the egress switches, a static egress node will not respond to the new configuration like a dynamic egress node. Rather, origination node 2 will continue to send the same distribution regardless of the end result of the call.

With either static or dynamic allocation, with virtual homing, it is important to realize that the link/trunk bundle will carry traffic that may not be destined for the egress node. Thus, traffic that is not destined for the egress node, for example egress node 10 in FIG. 2, will continue to use the same DCR routing rules and share the same links or trunks.

Figure 3:
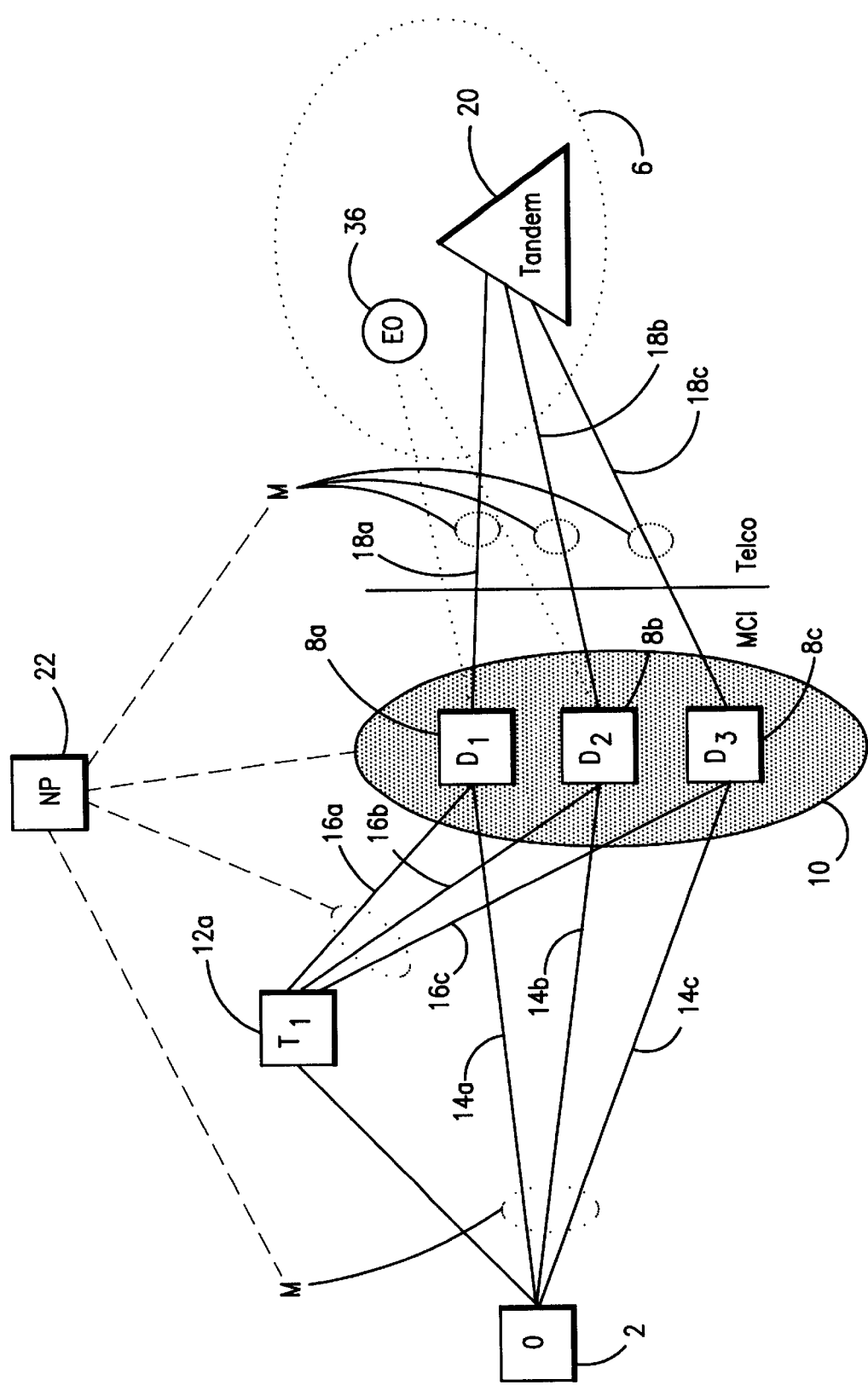
FIG. 3 is an illustration of the first method in the network processor (NP) approach of the instant invention.

Having thus provided the definitions and basic concepts of the instant invention, the network processor (NP) approach of the instant invention, with respect to method 1 thereof, is shown in FIG. 3. Components of FIG. 3 that are the same or similar to the components shown in FIG. 2 are designated with the same numbers. In particular, the incoming call traffic from origination node 2 is allocated among each of the direct inter-machine trunks (IMTs) 14a, 14b and 14c to egress node 10, and specifically to terminating switch 8a, 8b and 8c, respectively. If all direct IMTs 14a, 14b and 14c are busy, a best tandem node, such as 12a, is selected for routing the call traffic. If tandem node is likewise busy, the call traffic is sent to an exception method, to be discussed below. Note that the status of the various links, trunks and components of the DCR network are monitored by the network processor (NP) 22 which collects the statistics data from each of those components in order to determine the capacity for each of those components to carry call traffic.

From tandem node 12a, the call traffic is distributed to all three of the IMTs 16a, 16b and 16c that connect tandem node 12a to terminating switches 8a, 8b and 8c, respectively. The directing of the call traffic onto the three IMTs from tandem node 12a is done by random distribution. As before, if any of the IMTs 16a, 16b and 16c is busy, the call traffic is then routed by the exception method. Once the call traffic is routed to the terminating switches of egress node 10, if for any reason, a call cannot be completed using the data filled routing that connect terminating switches 8a, 8b and 8c to end office 36 or tandem 20 of destination 6, the call is released back to the origination node 2 so that it may be routed to a different termination switch to destination 6 or to exception routing. The allocation of calls by origination node 2 to the direct trunks 14a–14c may be effected by a so-called leaky bucket method, to be discussed below.

The exception method with respect to FIG. 3 refers to the use of fixed hierarchial levels for routing. For example, calls may be routed to direct access lines; or if no direct access lines are available, to an end office. And if no end offices are available, calls may be directed to a tandem which may not even belong to the same DCR network. Failing this fixed routing, the network processor will be queried for some other way to route the call to destination 6, even if the network needs to incur a loss in routing the call, because not to complete the call to its destination means that the customer would most likely not use the network next time. Thus, the network may even use a WATS line of another network, if it needs to, in order to complete the call.

Figure 4:
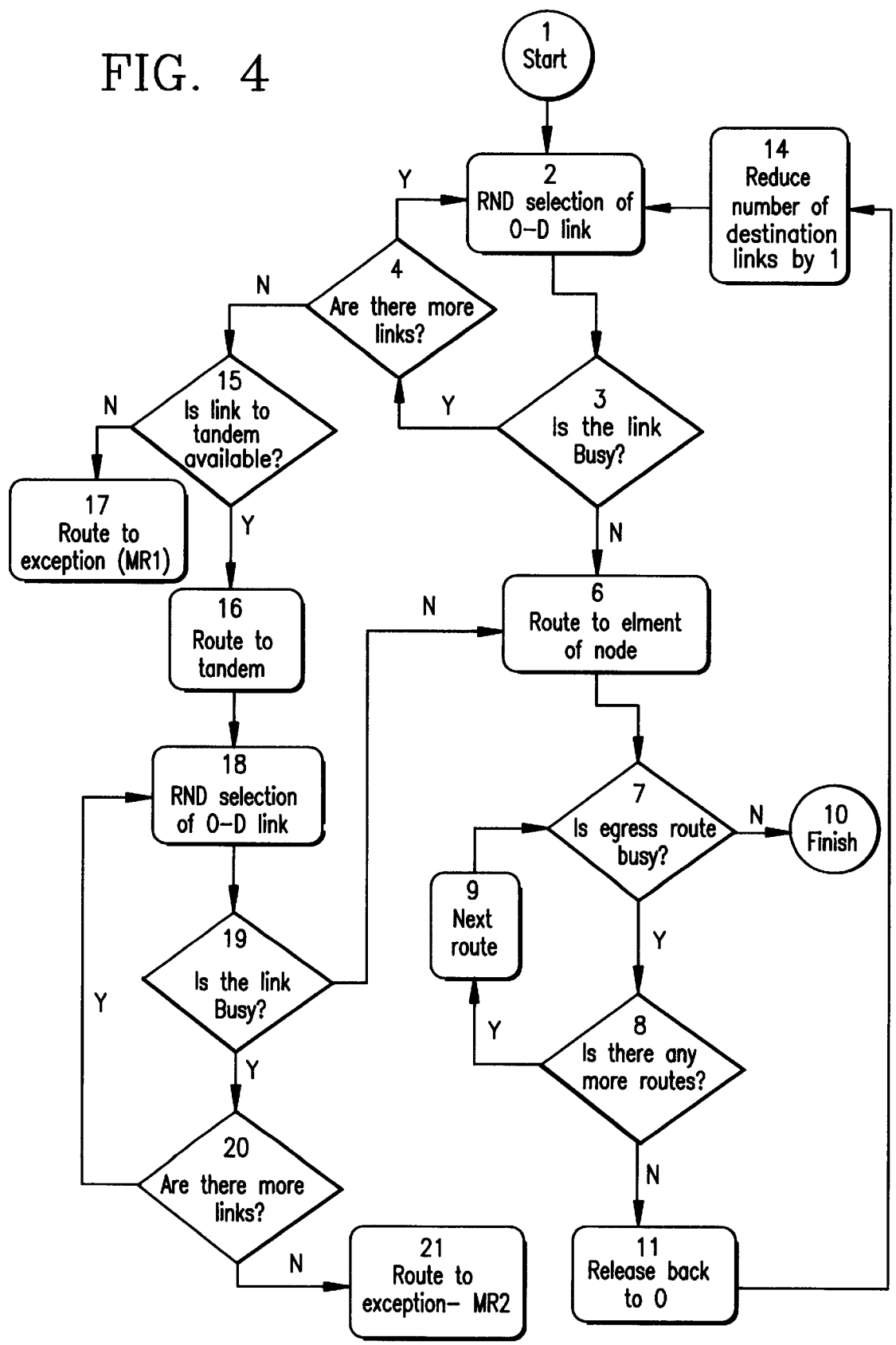
FIG. 4 is a flow chart illustrating the NP method of FIG. 3.

A flow chart illustrating the routing of a call from origination node to the termination switches, or destination switches, of egress node is given in FIG. 4. As shown, in receipt of an incoming call, one of the O-D links, i.e. trunks 14a–14c, is randomly selected in step 2. Whether or not the selected link is busy is determined in decision step 3. If it is, a determination is made in step 4 on whether or not any of the other available links or trunks is available. If there are, one of those available trunks is randomly selected per step 2.

Staying with the right branch of the flow chart of FIG. 4, assume that the randomly selected link is not busy, the method of FIG. 3 proceeds to step 6 in which the call is routed to one of the terminating switches 8a–8c of egress node 10. Thereafter, a determination is made in step 7 on whether the egress route that connects that terminating switch to the destination is busy. If it is not, the call is routed thereon to the destination and the process is finished as indicated by step 10. However, if that particular egress trunk is indeed busy, a determination then needs to be made per step 8 on whether any other egress routes or trunks are available. If there are, then the call is transferred to the termination switch to which that available route is a part of, per step 9. Again, per step 7, a determination is made on whether the egress link connected to that termination switch is available. If it is, the process is finished when the call is placed onto that egress link and routed to the destination. If, however, there are no more routes available, the call is released back to the origination node, per step 11, and the process proceeds to step 14 whereby the number of destination links is reduced by one. Thereafter, the process returns to step 2 and the same operations noted above are repeated.

Returning to step 4 of the flow chart, if a determination is made that there are no more trunks available between origination node and egress node 10, then the process proceeds to step 14 to make a determination on whether there is any link connected to any tandem nodes. If there are none, then the process proceeds to the exception method, per step 17. However, if there are available links, then the call is routed to the tandem node, as for example 12a in FIG. 3. Thereafter, a random distribution selection of a link or trunk connecting the tandem node to the terminating switches of virtual node 10 is performed in step 18. If the chosen link is busy, as determined in step 19, then a determination is made per step 20 on whether or not there are additional links. If there are, the process returns to step 18 to make a further random distribution of the call onto the available links. If, on the other hand, no more links connecting the tandem node and the virtual node are available, the process proceeds to the exception method, per step 21. As indicated per step 19, if the link connecting the tandem node and the virtual node onto which the call is distributed is not busy, then the call is routed thereby to the appropriate terminating switch of egress node 10.

Figure 5:
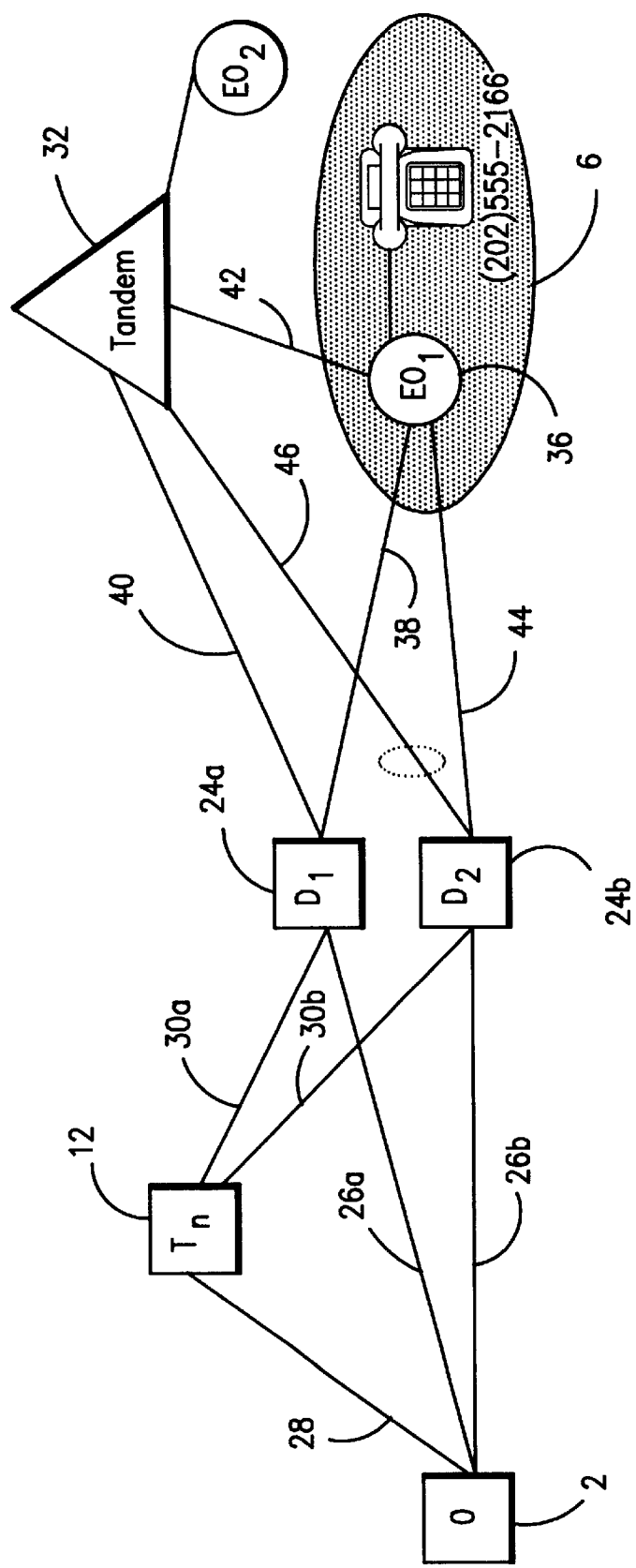
FIG. 5 is an illustration of the second NP method.

The exception method of the NP approach is illustrated in FIG. 5. By way of an overview, the exception method brings additional possibilities to virtual homing. This is because much of the DCR network consists of small trunk groups that do not qualify for a egress node—i.e., many of these trunk groups are not large enough to be homed onto multiple switches or the NP could not handle the large number of nodes that are required to support all of the trunk groups in the network. Thus, by implementing the exception method, calls are routed to a primary destination, which may consist of a direct and a tandem trunk group. If all of the route choices are busy on the primary destination, the call is released back to the origination switch to receive a second DCR recommendation to a different destination.

For the exception method shown in FIG. 5, because of the economics associated with terminating to the end office 36 of destination 6, the call from origination node 2 must be routed to a particular termination switch, such as for example switch 24a. At termination switch 24a, the call will try the direct trunk 38 to end office 36. If trunk 38 is busy, the call will overflow to trunk 40 so that the call may reach tandem node 32 and be rerouted thereby via trunk 42 to end office 36. However, if trunk 40 is also busy, the call will be released back to origination node 2.

The released call at origination node 2 will overflow into the exception routing where it will select the next destination or terminating switch, in this instance terminating switch 24b. Although terminating switch 24b is shown, it should be noted that a virtual node that comprises a number of terminating switches may also be used. In any event, upon being routed to terminating switch 24b, the same process is repeated whereby an attempt is made on routing the call from terminating switch 24b to end office 36 via trunk 44. An if trunk 44 is busy, the call is routed by terminating switch 24b to tandem switch 32 via trunk 46, and then via trunk 42 to end office 36. For the FIG. 5 exception method, if after the second termination switch fails to complete the call, the call is released back to origination switch 2 and sent via a WATS line, possibly belonging to a different network, so that the call can be routed to destination 6.

Figure 6:
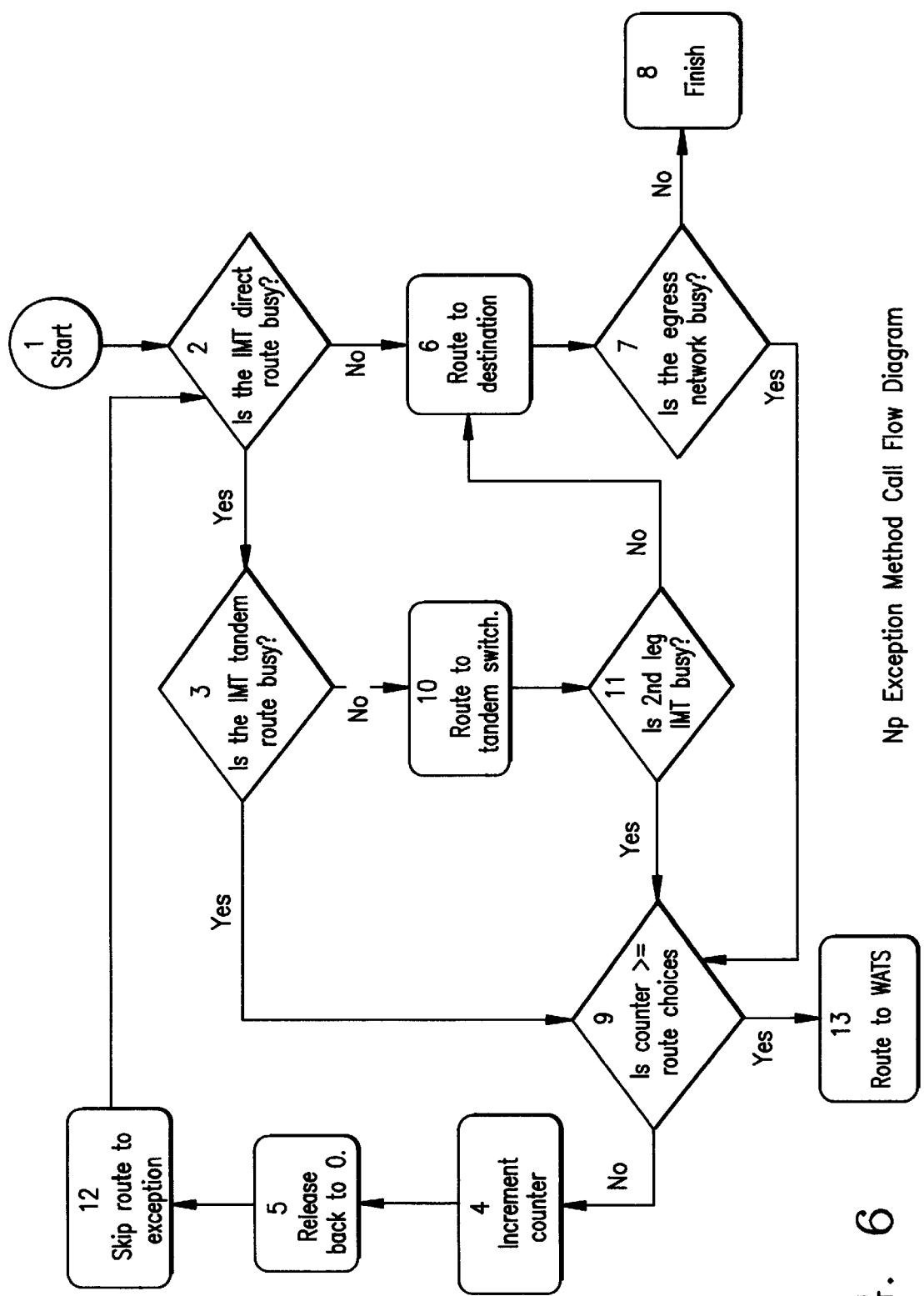
FIG. 6 is a flow chart of the FIG. 5 method.

The call flow diagram of the exception method of the NP approach is shown in FIG. 6. As shown, a first determination is made in step 2 on whether the IMT direct route is busy. If it is not, the call is routed to the destination switch, i.e. termination switch 24a, per step 6. Thereafter, a determination is made on whether the egress trunk, such as trunk 38, is busy per step 7; if not, the process is finished insofar as the call is routed to end office 36 via trunk 38.

On the other hand, if a determination is made that the IMT direct route, i.e. trunk 26a, is busy, and assuming that there are no other termination switches, a determination is made, per step 3, on whether the IMT trunk connecting origination node 2 to tandem node 12 is busy. It is not, the call is routed to tandem switch 12. Thereafter, a determination is made on whether the trunk connecting tandem node 12 to terminating switch 24a is busy per step 11. If not, the call is routed to terminating switch 24a per step 6; and thereafter, depending on whether or not the egress trunk 38 is busy per step 7, the call is routed to end office 36 and the process finished per step 8.

If, however, trunk 30a that connects tandem node 12 and terminating switch 24a is busy, a determination is made on whether the count number in a given counter, not shown, is greater or equal to the number of route choices, per decision step 9. If the predetermined count is reached, then the process proceeds to route the call by means of a WATS line, per step 13. If, on the other hand, the predetermined count has not been reached, the counter is incremented, per step 4. The call is then released back to the origination node 2. After that, per step 12, the call skips the exception method and returns to step 2, so that the same process may be repeated again.

As noted above, one of the major aspects of the instant virtual homing invention is to distribute the call traffic from the origination node among the IMTs that connect the origination node to the terminating switches, be they a part of a egress node or otherwise. This distribution should be effected so that the calls from the origination node would have the highest probability of completion on the route that offers the most economy.

The leaky bucket method, as noted above, involves the use of an algorithm to determining the call distribution that will be executed for distributing the call traffic onto the IMTs connecting the origination node and the terminating switches. From empirical studies, the inventors of the instant invention deem the following statistics to be required for the calculation of the algorithm: the idle trunk count for each trunk group (defined as part of a virtually homed serving area); the count of calls overflowing from each trunk group; the count of calls carried over each trunk group; and the measure of call processing capacity remaining on the switch. These various statistics data, as noted above, are collected by the centralized network processor, which gathers the statistics from each of the network switches during a predefined polling period. The network processor will then make calculations to determine the correct percentage of calls to route toward each of the terminating or egress switches defined in each of the serving areas.

Using the statistics data gathered from the various switches of the network, the network processor can then determine the percentage of available capacity at each egress or terminating switch for each level of trunking hierarchy defined in the serving area. Then by using predefined weights for each of the hierarchial level, the processor can determine the correct percentage of calls to route to each of the egress or terminating switches in each of the defined serving areas. The percentage of traffic will either be downloaded to each switch in the network during a predefined download period, or will be held in a centralized network control point so as to be available for all call queries.

The algorithm to be used for determining the percentage of calls to route to a particular switch defined in a serving area is:

$$\%_a = \frac{\sum_{i=1}^{n} (w_i * I_i^{Sa} * C_i^S)}{\sum_{i=1}^{n} (w_i * I_i^S * C_i^S)} * G \text{ where}$$

n=levels of hierarchy defined for serving area S;
$w_i$=weighting factor of hierarchical level i (may be based on level of hierarchy, cost, or time factors);
$I_i^{Sa}$=Idle trunks in hierarchical level i, on switch a, for serving area S;
$I_i^S$=Idle trunks in hierarchical level i, for serving area S;
$C_i^S$=% of calls carried on hierarchical level i, for serving area S, as calculated by:

$$C_i^S = \max\left(0, \frac{c_i^S}{c_i^S + o_i^S} * \left(1 - \sum_{j=1}^{i-1} C_j^S\right)\right) \text{ where}$$

$C_i^S$=calls carried on hierarchical level i, for serving area S;
$O_i^S$=calls overflowed on hierarchical level i, for serving area S; and
G=Gapping factor (for mass call control)

A different approach that may be taken with respect to the instant invention is the data access point (DAP) approach. This DAP approach takes advantage of the network's intelligence to solve virtual homing. There are three basic methods in implementing virtual homing onto the intelligent network, The first method of the DAP approach requires that every call be sent to the DAP for retrieving the information. The DAP responds with a single terminating switch ID and trunk group. If the recommendation does not enable the completion of the call, the call is released back to the origination switch and a new call query is sent to the DAP. The process will continue until the call completes or a predetermined number of queries, or dips, have been directed to the DAP.

The second method of the DAP approach is similar to the first. Here when a call performs the DAP query, the DAP responds with all possible routes for that call. The route choices are based on the conditions of the network. Each possible route is tried until the call completes or until all route choices are exhausted.

The last method of the DAP approach first routes the call to a primary destination. If that fails, the call is released back to the origination switch and a DAP query is performed for the next destination. Unlike the NP approach, a full intelligent approach allows the network to implement unlimited number of virtual nodes with any type of trunk selector.

Figure 7:
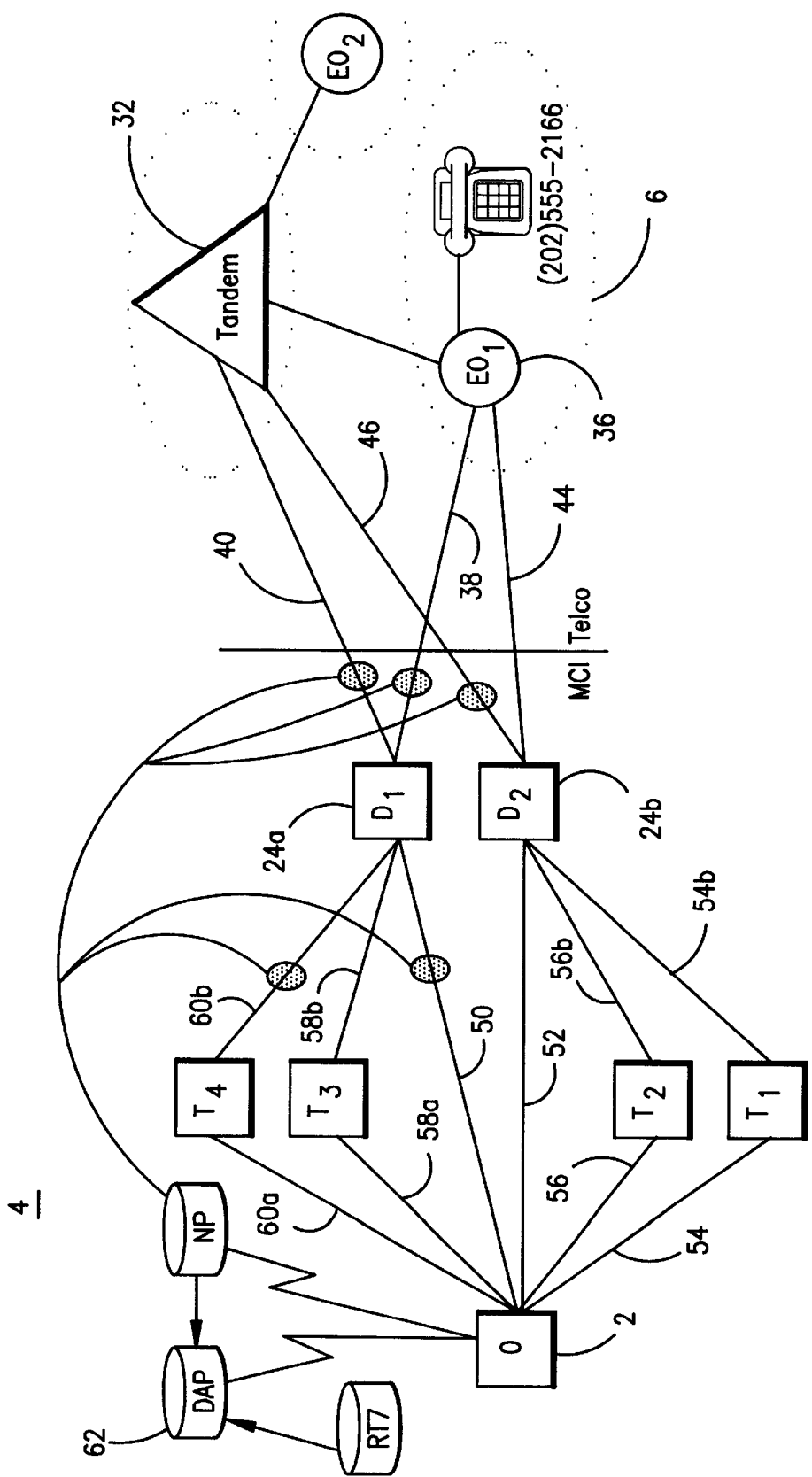
FIG. 7 provides an illustration of the first method in the DAP approach of the present invention.

FIG. 7 is a representation of the first method of the DAP approach. As shown, connected to origination node 2 are a number of trunks each connected to a tandem switch or a termination switch. In particular, a trunk 50 connects origination node 2 to termination switch 24a and a second trunk 52 connects origination node 2 to terminating switch 24b. As shown, there are four tandem nodes, $T_1$, $T_2$, $T_3$ and $T_4$, connected by trunks 54a, 56a, 58a, and 60a, respectively, to origination node 2. Tandem nodes $T_1$ and $T_2$ are also connected to terminating switch 24b by way of trunks 54b and 56b, respectively. Similarly, tandem nodes $T_3$ and $T_4$ are connected to terminating switch 24a by means of trunks 58b and 60b, respectively. Terminating switches 24a and 24b are also connected to destination 6, and specifically end office 36 by a trunk 38 and a trunk 44, respectively. Egress trunks 40 and 46 connect terminating switches 24a and 24b, respectively, to tandem switch 32 outside of DCR network 4. As shown, the capacity of the various nodes and trunks are being monitored by the network processor.

For the FIG. 7 method, when a call enters the network, it immediately performs a query to DAP 62. DAP 62 then returns a response that includes a terminating switch and trunk ID. The DCR network will route the call to the appropriate terminating switch in accordance with the terminating switch ID providing by DAP 62. However, if it fails on the IMT, such as for example trunk 50, and in a DCR tandem attempt, such as for example $T_1$ and trunk 54a, the call is released back to origination node and a second call query is input to DAP 62 for a different terminating switch. Assuming that DAP 62 provides to origination node 2 the IDs of terminating switch 24b and trunk 52, the call is routed to terminating switch 24b by way of trunk 52.

At terminating switch 24b, an attempt is made to direct the call onto egress trunk 44 so that the call may be directed to the destination end office 36. If somehow egress trunk 44 is busy and the attempt fails, the call is released back to origination node 2 so that a new query is put forth to DAP 62. This new query would include a counter of the number of times it has queried DAP 62, which will use the counter as an index to the next possible route.

For example, suppose DAP 62 has five possible routes for a particular number. Thus, if a call returns for a second DAP query, it will also send to the DAP the number of tries already attempted. The DAP will use the number of tries as an index into the listing of possible routes. For this example, it will select the second route, the third route, the fourth, and the fifth route sequentially. Note however that if the routing is dynamically updated, a different route which may not have been feasible in the first try will become feasible later on.

This process of seeking new destination switches will continue until the call is completed, the DAP has run out of route choices, or the number of Dips into the DAP exceeds the predetermined count number.

Figure 8:
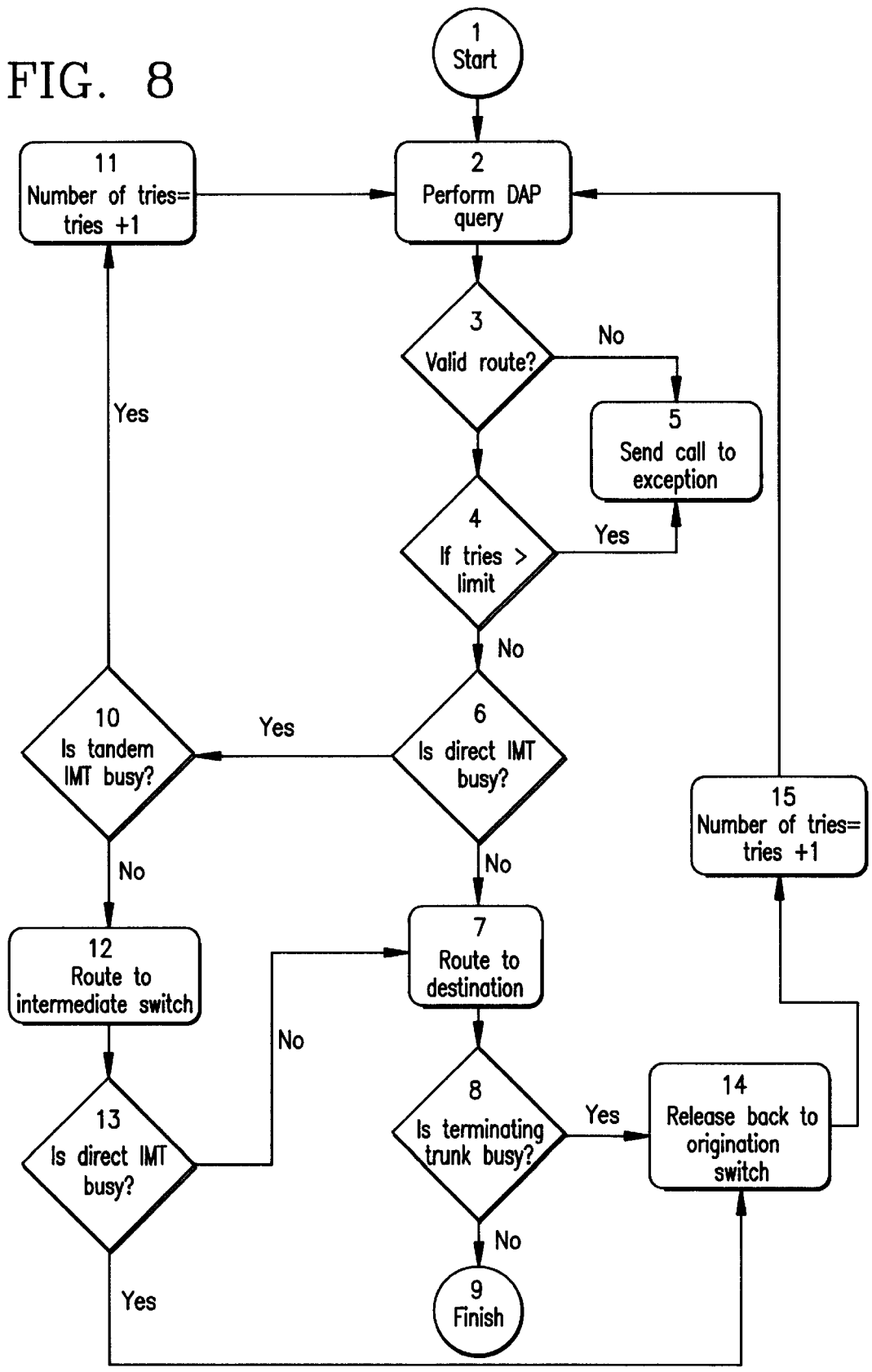
FIG. 8 is a flow chart of the method illustrated in FIG. 7.

The flow diagram for the FIG. 7 method is given in FIG. 8. As shown, a step query is performed in step 2. A determination is then made on whether or the response from the DAP provides for a valid route per step 3. If not, the call is sent to the exception method per step 5. If the response from the DAP indeed provides for a valid route, then a determination is made per step 5 on whether the number of DAP queries, or dips to the DAP, has exceeded a predetermined limit. If it has, the process proceeds to the call exception method per step 5. If it has not, then the next determination is on whether the IMT to which the call is to be routed to the terminating switch is busy per step 6. If it is not, the call is routed to the terminating or destination switch per step 7. Thereafter, a determination is made on whether the egress trunk that connects the terminating switch to the destination outside the network is busy per step 8. If it is not, the call is routed onto the egress trunk and the process finishes, as indicated per step 9. On the other hand, if the egress trunk is busy, the call is released back to the origination switch per step 14. Thereafter, the number of tries, or the number of dips to the DAP, is incremented. The process then returns to step 2 to perform the next DAP query.

For the FIG. 8 flow diagram, if the direct IMT that connects the origination node to the terminating switch is busy, then a determination is made, per step 10, on whether the IMT that connects the origination node to the chosen tandem node is busy. If it is, the number of tries is incremented, per step 11, and the process returns to step 2 for repeating the process. However, if the tandem IMT is not busy, then the process is routed to block 12 which indicates that the call is routed to the tandem switch, i.e. an intermediate switch. Next, a determination is made on whether the direct IMT connecting the tandem switch to the terminating switch is busy. If it is not, the call is then routed to the terminating switch per step 7 and the process then proceeds to step 8 and then step 9 or step 14. However, if the direct IMT is indeed is busy, then the process proceeds to step 14 and the process is repeated as note above.

Figure 9:
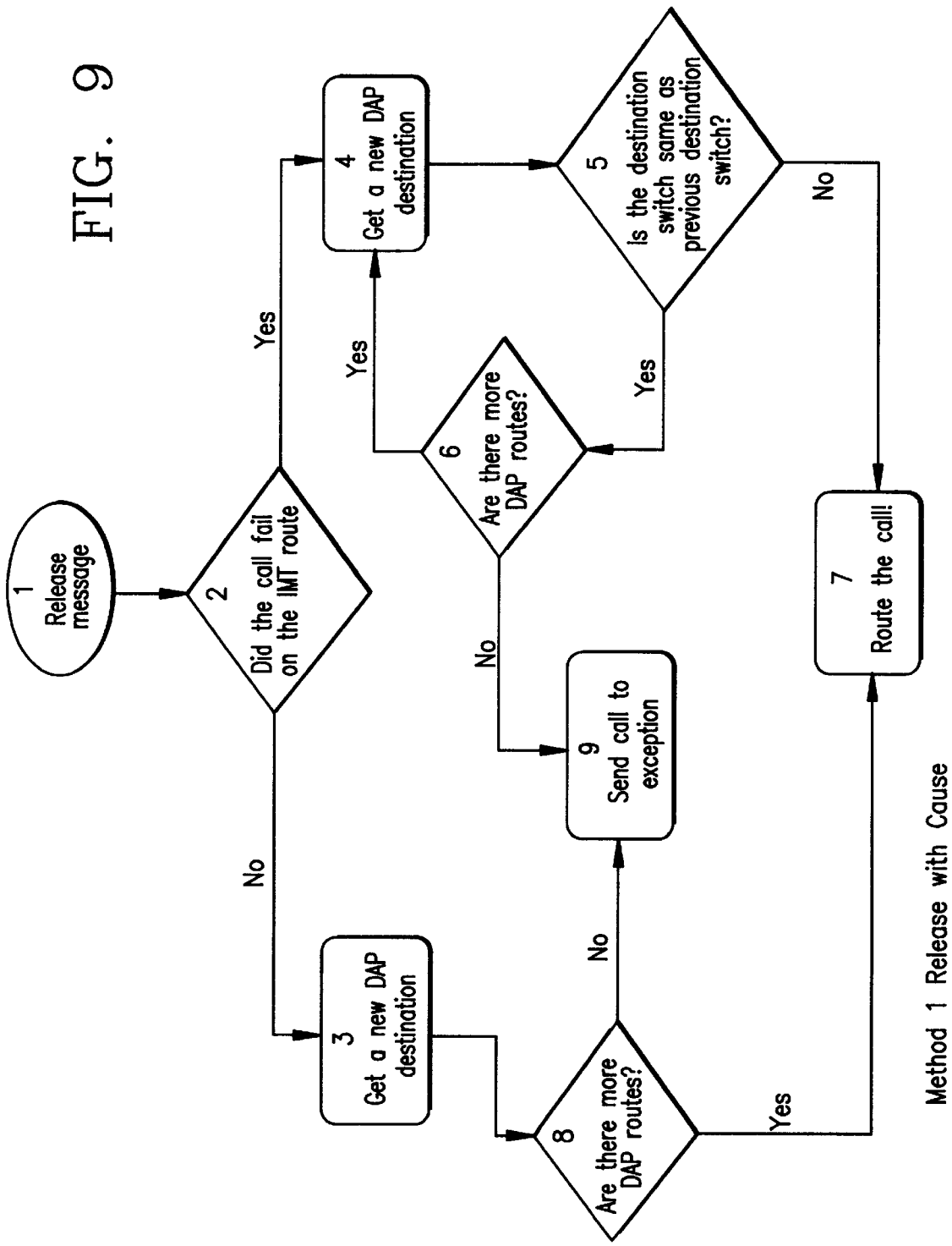
FIG. 9 is an additional flow chart illustrating the releasing with calls of the method of FIG. 7.

Depending on where the call fails, the first method of the DAP approach will react differently. This is shown in the release with cause (RWC) flow chart of FIG. 9. Starting with the receipt of a release message in step 1, a determination is made on whether the call fails on the IMT route. If yes, the process will obtain a new DAP terminating switch ID per step 4. Once the terminating switch ID is obtained from the DAP, a further determination is made in step 5 on whether that terminating switch is the same as the previous terminating switch. If not, the call is routed per step 7. However, if indeed the retrieved terminating switch is the same as the previous terminating switch, then the process proceeds to make a determination, per step 6, on whether there are additional routes that may be retrieved from the DAP. If yes, the process proceeds to step 4 to retrieve the new DAP terminating switch. If no, the call is sent to the exception method. On the other hand, if the call has not failed on the direct IMT trunk, then a new terminating switch is retrieved from the DAP per step 3. Whether or not there are additional DAP routes is determined per step 8. If there are, the call is routed per step 7. If there are not, then the call is again routed to the exception. Note that the rules that DAP 62 exercises are provided thereto by the RT7 store, which acts as a data warehouse.

The second method of the DAP approach can also be described with reference to FIG. 7. For this second DAP approach method, every call that originates in the network is sent to the DAP. The DAP in turn will return a listing of possible terminating route choices. The call will follow the standard DCR routing to the first terminating switch. The call will try all of the sequential route choices for that termination. If the route(s) is busy, the call will be released back to the origination switch and sent to the next terminating switch, based on the order of routes returned by the DAP. However, if the call fails on the IMT to a particular terminating switch, in addition to releasing the call back to the origination switch, the failed terminating switch is also deleted from the listing of the routes. A next valid terminating switch is then selected. Since the DAP controls the number of route choices given to each call, the number of routes being processed is controlled.

The egress routing for the second DAP method is somewhat different from the first DAP method. Here, when the call reaches the terminating switch, it will try the egress trunk group. If the call fails to be completed, the next route choice in the listing of routes returned by the DAP is checked to determine if the call can stay on the same terminating switch. If it can, the call would attempt the next route choice. However, if the route choice fails or if the next route choice is on a different terminating switch, the call is released back to the origination switch so that a next route may be selected. With reference to FIG. 7, note that when a call originates from origination switch 2, a DAP query is sent DAP 62. The DCR network will then route the call to the terminating switch, for example switch 24a. If it fails due to a blockage at the IMT, for example trunk 50 that connects origination switch 2 to switch 24a, the call is released back to origination switch 2 so that a next unique terminating switch may be selected from a listing returned to origination node 2 from DAP 62. The failed terminating switch route is deleted from the routing list.

Assume the call has reached the terminating switch. There the call will try the egress trunk, for example, trunk 44. If trunk 44 fails, the call will check the route listing from the DAP to determine if it can stay on the same terminating switch, for example switch 24b. If it can, the call will try the next route choice, such as for example IMT 46 connecting switch 24b to tandem switch 32. If the call cannot remain on the same terminating switch, the call is released back to origination node 2 so that a next destination route may be selected. The process will continue until the call is completed or when the route choices on the routing list run out.

Figure 10:
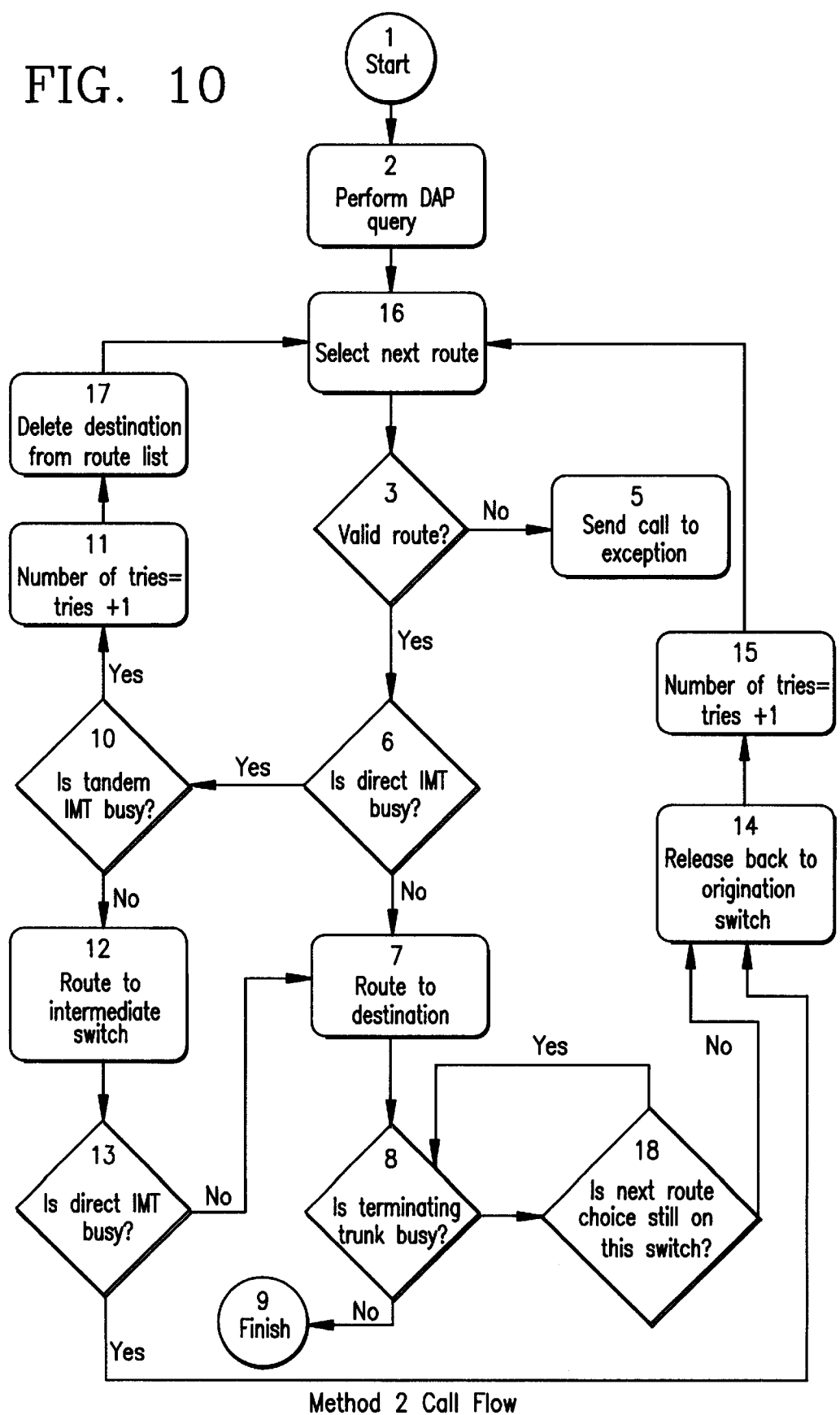
FIG. 10 is an illustration of a flow chart of a second method of the DAP approach, which can also be referenced to the illustration in FIG. 8.

FIG. 10 is a flow diagram illustrating the processing of the DAP second method. As shown, a DAP query is performed in step 2. Thereafter, depending on the route provided by the route listing from the DAP, a given route is selected per step 16. Whether or not that route is a valid route is determined in step 3. If it is not a valid route, the call is sent to the exception, per step 5. If it is a valid route, then a determination is made on whether the direct IMT that connects the origination node to the terminating switch is busy, per step 6. If it is not, the call is routed to the terminating switch per step 7. If it is, a determination is made on whether an alternate tandem IMT is busy, per step 10. If the IMT connecting the origin node to the tandem node is not busy, the call is routed to the tandem node, per step 12. Thereafter, a determination is made on whether the direct IMT connecting the tandem node to the terminating switch is busy, as shown in step 13. If it is not, the call is routed to the terminating switch, per step 7. If it is, the call is released back to the origination switch, as shown in step 14. Thereafter, the number of tries is incremented per step 15 and the next route is selected from the routing list, per step 16.

If, on the one hand, when after the call is routed to the terminating switch, per step 7, a determination is made, per step 8, that the egress trunk connecting the terminating switch to the destination is not busy, then the call is directed to the destination and the process is finished, as indicated per step 9. On the other hand, if the egress trunk is busy, a next route is retrieved from the routing list, per step 18, and a determination is made on whether this next route can be directed from the same terminating switch. If it cannot be, the call is released back to the origination switch 14 and steps 15 and 16 are repeated. However, if the call can remain on the same terminating switch, the process proceeds to step 8 to determine whether the egress trunk is busy, so that a determination can be made on whether the call can be routed to the destination.

Returning to step 10, after a determination is made that the IMT connecting the tandem node to the terminating switch is indeed busy, then the process proceeds to step 11 so that the number of tries is incremented by 1. Thereafter, the process proceeds to step 17 to delete from the routing list the particular route. After that, the process proceeds to step 16 to select yet another route.

Figure 11:
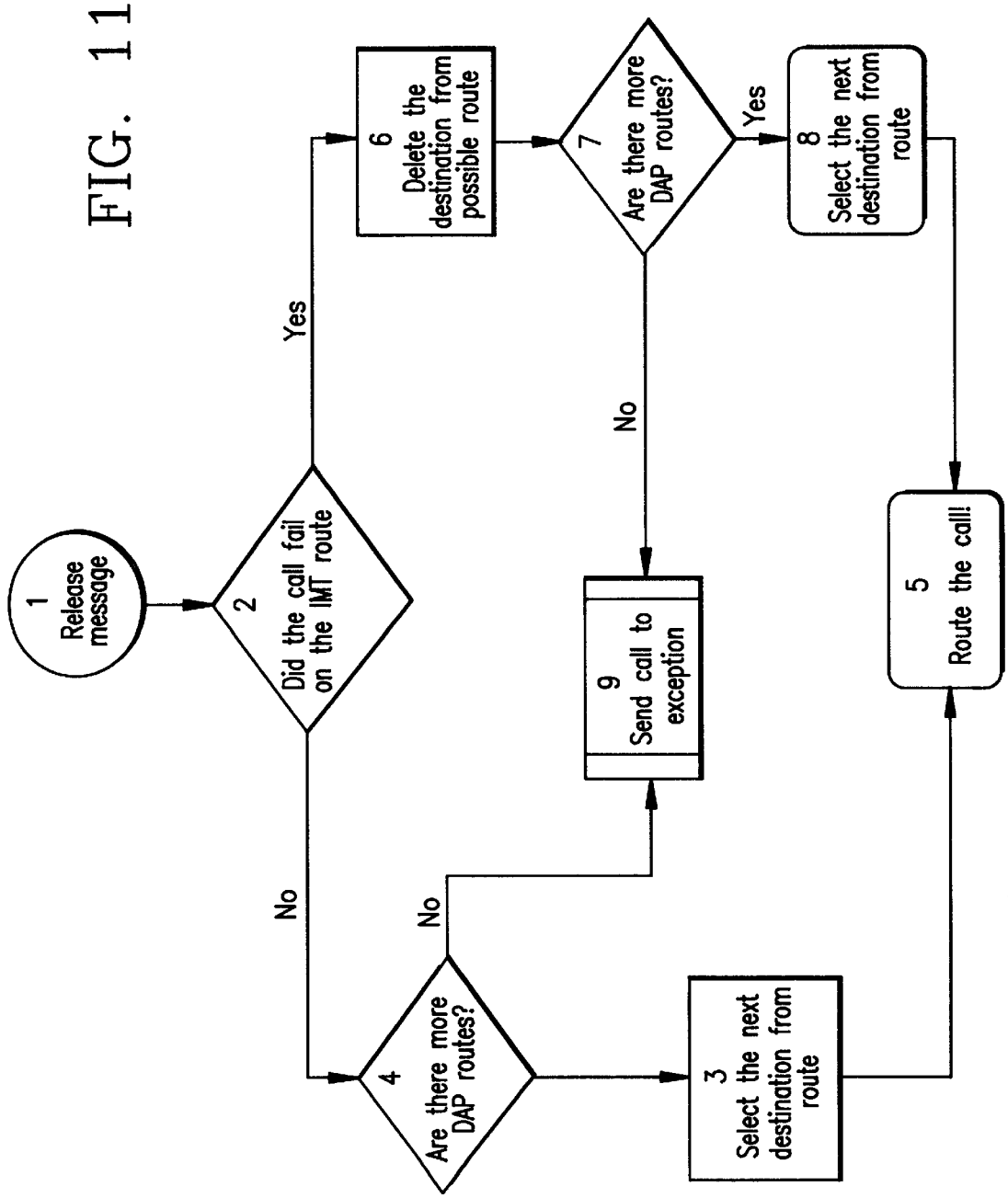
FIG. 11 is the flow chart with release with calls for the second DAP method.

Similar to the first method of the DAP approach, the second DAP method also has a release with cause process which releases the call back to the origination switch depending on where the call fails in the routing process. As shown in FIG. 11, if the call fails on the IMT that connects the origination node to the termination switch, per step 2, then the process proceeds to step 6 whereby the terminating switch is deleted from the route list. Thereafter, a determination is made per step 7 to find additional DAP routes. If there are additional DAP routes, the next terminating switch is selected from that route, per step 8 and the call is then routed accordingly per step 5. If on the other hand, the call did not fail on the IMT that connects the origination node to the terminating switch, as determined per step 2, then a determination is next made on whether or not there are more DAP routes, as indicated per step 4. If there are, the next terminating switch is selected from the route list per step 3 and the call is accordingly routed per step 5. If there are no more DAP routes as determined per step 4, then the call is sent to the exception method per step 9.

For both first and second methods of the DAP approach, a heavy load is placed on the DAP due to the fact that for every call, a DAP query is sent to the DAP. For the MCI DCR network, since a call has about 70% chance of completing on a first attempt, by using switch based routing for the first attempt and then allowing attempt overflow of the queries to the DAP, the load placed on the DAP will accordingly be reduced approximately 70%.

The third DAP method can also be discussed with reference to FIG. 7. For this method, when a call originates from origination node 2, it is routed to a terminating switch via the IMT connecting the origination node to the terminating switch. If the call is blocked at any point, it is released back to the origination switch and a DAP query is performed to get a new terminating switch. The call is routed to the new terminating switch. If the call again fails at any point during transit, the call is released back to origination node and another query is sent to the DAP. If the call does reach the primary terminating switch, all available routes are next tried in order to direct the call to the destination. If the network processor fails to find any available capacity, the call is released back to the origination node. Thereafter, the DAP is again queried to get a new terminating switch. This process is repeated until either the call is completed, all possible routes are exhausted, or the number of DAP dips exceeds a predetermined count or limit.

Figure 12:
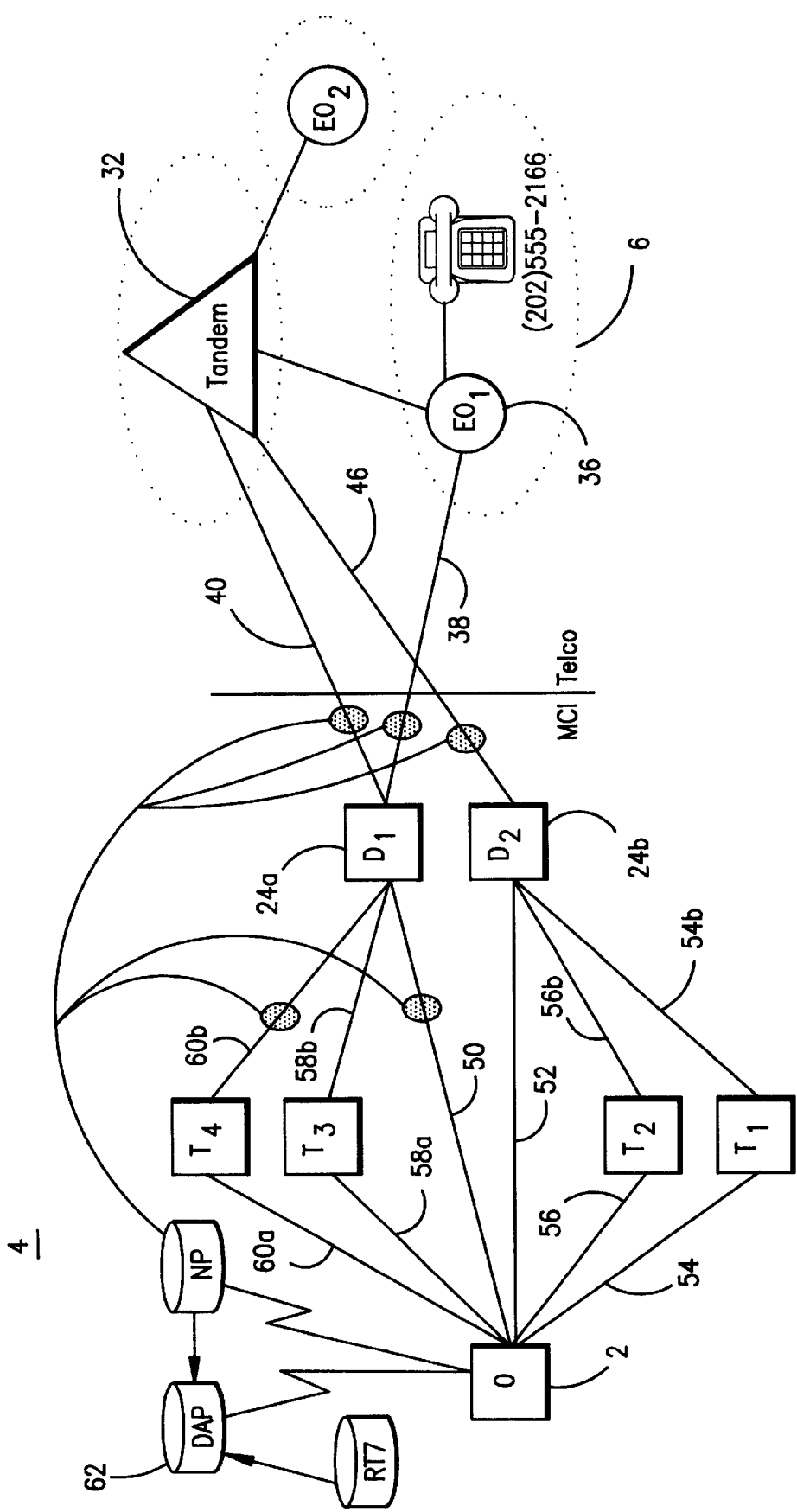
FIG. 12 is an illustration of the third method of the DAP approach of the instant invention.

With reference to FIG. 12, an example of the third DAP method is given. As shown, no trunk connects terminating switch 24*b* to end office 36. Thus, the only trunk that connects end office 36, which is the destination, to the DCR network is egress trunk 38, which other end is connected to terminating switch 24*a*. Accordingly, terminating switch 24*a* must be the primary route choice because of the economics involved, i.e. it is the only terminating switch that already has an egress trunk connected to the destination. According to this DAP method, therefore, if egress trunk 38 is busy, the overflow will transit on egress trunk 40 that connects terminating switch 24*a* to tandem switch 32, before the call is released back to origination node 2 for sending a new query to DAP 62. Thus, for this DAP method, the primary choices are fixed.

Figure 13:
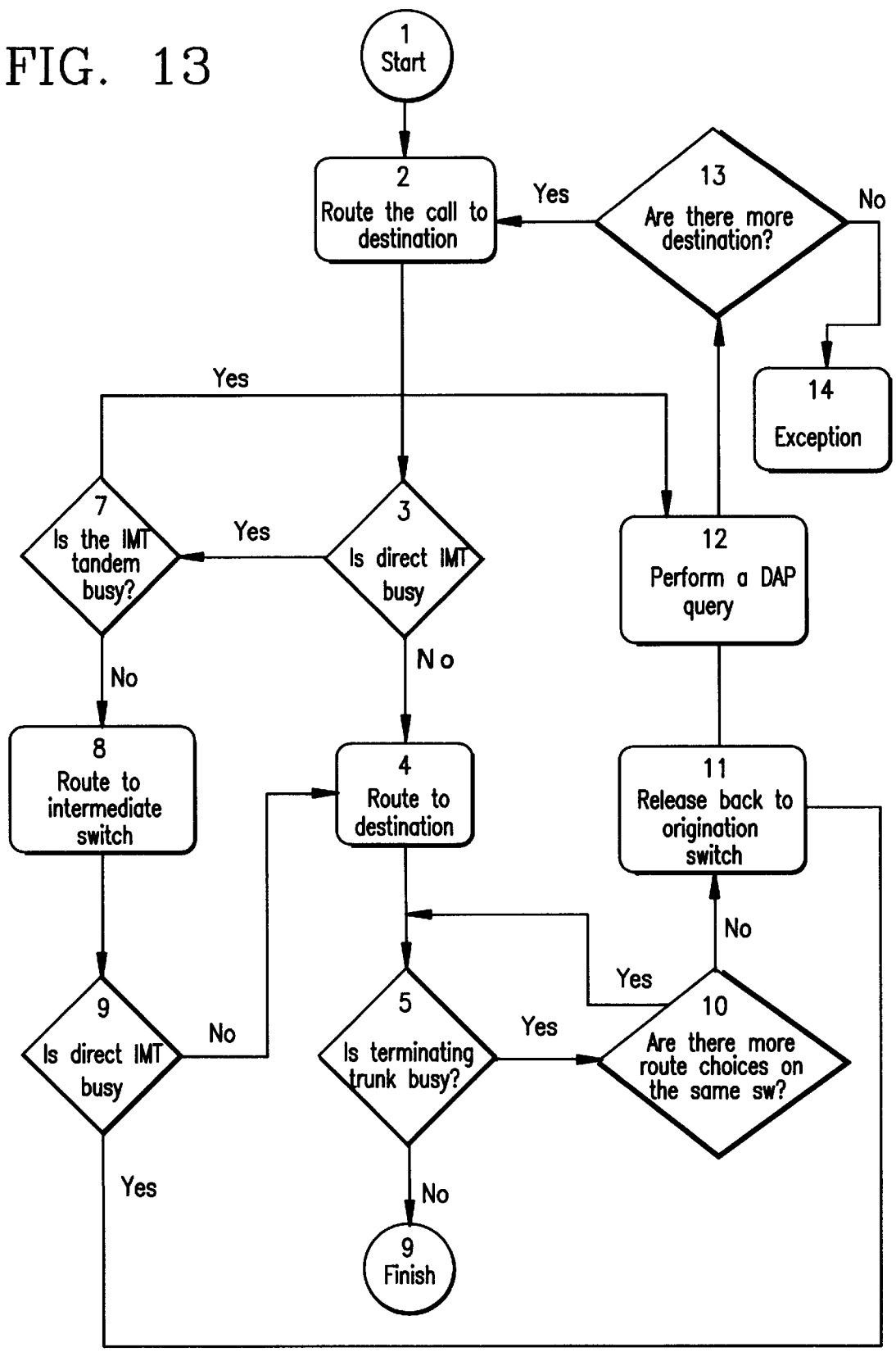
FIG. 13 is the flow chart of the third DAP method discussed with reference to the FIG. 12 illustration.

The flow diagram for the third DAP method is given in FIG. 13. As shown, the call is first routed to the destination or termination switch per step 2. A determination is then made in step 3 on whether the IMT connecting the origination node and the terminating switch is busy. If it is not, the call is routed to the terminating switch, as shown in step 4. A determination is next made on whether egress trunk that connects the terminating switch to the destination is busy, per step 5. If it is not, the call is forwarded to the destination and the process ends, as indicated per step 6. If however the egress connecting the terminating switch to the destination is busy, then a determination is made per step 10 on whether there are more route choices on the same terminating switch. If there are, the process returns to step 5 for further determination of the egress trunks. If there are no other choices, the call is released back to the origination switch, as indicated in step 11. Thereafter, a DAP query is performed per step 12 and a determination is made on whether there are additional terminating switches per step 13. If there are, the call is routed to that terminating switch. If there are no other terminating switches, the calls are passed onto the exception routing, per step 14.

After a determination is made, per step 3, that the IMT connecting the origination node to the terminating switch is busy, a determination has to be made on whether the IMT connecting the terminating switch and the tandem switch is busy, per step 7. If it is, the process proceeds to step 12 to perform another DAP query. The process is again repeated. On the other hand, if the IMT connecting the terminating switch and the tandem node is not busy, the process proceeds to route the call to the tandem node, per step 8. Thereafter, a determination is made on whether the IMT connecting the tandem node to the terminating switch is busy per step 9; if it is not, the call is routed to the terminating switch per step 4 and the process proceeds as before. If however the IMT connecting the tandem node and the terminating switch is busy, then the process proceeds to step 11 whereby the call is released back to the origination switch. The process thereafter proceeds as discussed previously.

Figure 14:
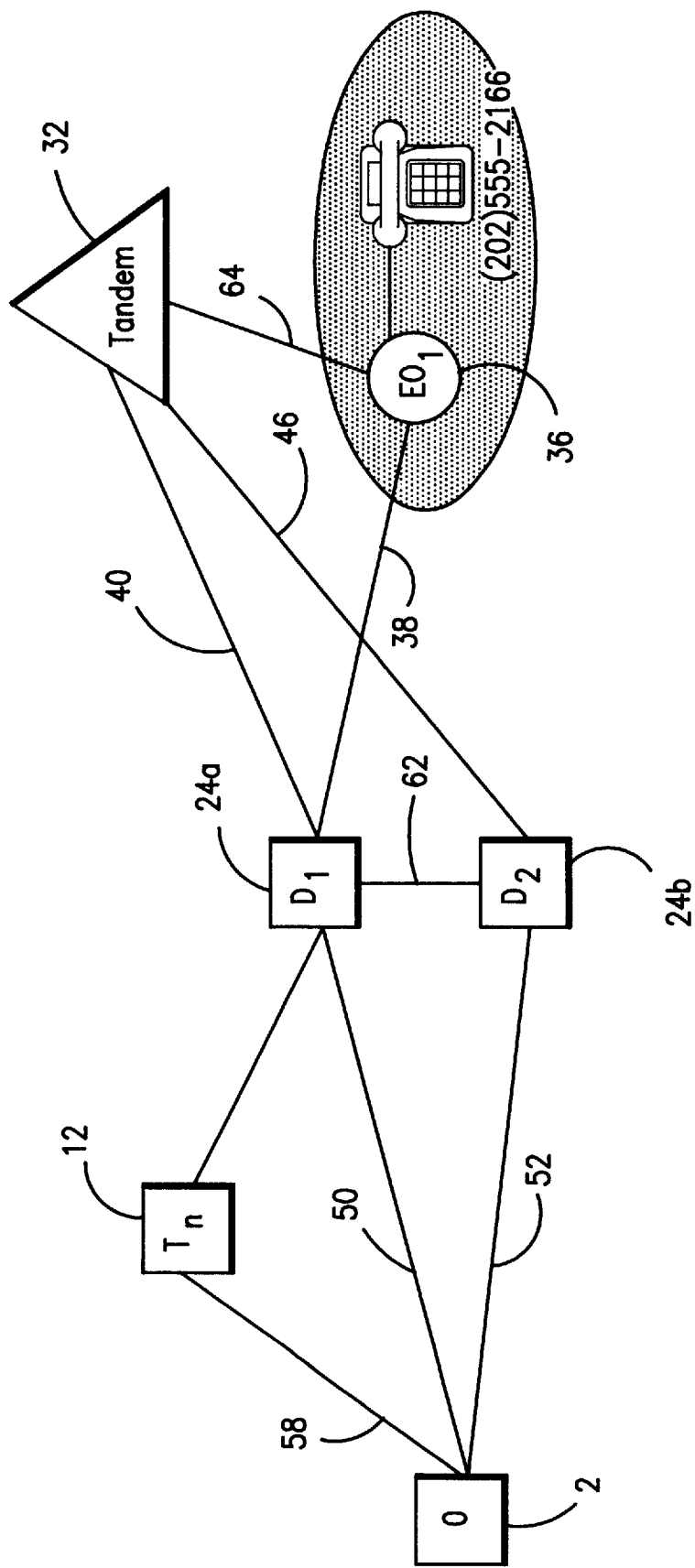
FIG. 14 is an illustration of the sequential method.

A last method of the instant invention is the sequential method illustrated in FIG. 14. For this method, the call originating from origination node 2 will follow a switch based routing to a terminating switch, as for example, terminating switch 24*a*. If the IMT trunk 50 that connects origination node 2 to terminating switch 24*a* fails, the sequential method will try a DCR tandem path, i.e. routing the call from origination node 2 to tandem node 12. If the call cannot be completed, it is sent to exception routing.

Suppose the call is now routed to terminating switch 24*a*. At this time the call will try a switch base routing to end office 36. If it fails to complete due to a failure at egress trunk 38, the call will be rerouted to egress trunk 40 and directed to tandem node 32. If the call nonetheless fails to be routed to tandem node 32 due to a failure in trunk 40, the call is routed to the secondary terminating switch which, for this instance, is switch 24*b*, by means of trunk 62 which connects terminating switch 24*a* to terminating switch 24*b*. From terminating switch 24*b*, the call can be routed to tandem node 32 via egress trunk 46. Tandem trunk 32, providing that it does receive the call, will route the call via trunk 64 to end office 36. If, on the other hand, the call cannot be routed from terminating switch 26*b* to tandem node 32 due to a failure in egress trunk 46, the call is sent directly to exception routing.

Inasmuch as the present invention is subject to many variations, modifications, and changes in detail, it is intended that all matters described throughout this specification and shown in the accompanying drawings be interpreted as illustrative only and not in a limiting sense. Accordingly, it is intended that the invention be limited only by the spirit and scope of the appended claims.

We claim:

1. In a telecommunications network, a method of reducing the risk of traffic not being routed from an origination node to a destination due to outages at nodes of said network, comprising the steps of:

forming an egress node from a plurality of network switches, any one of said switches adaptable to route traffic to said destination;

allocating traffic among a number of direct trunks each connecting said origination node to one of said switches of said egress node;

selecting a tandem node connected to both said origination node and said egress node to route the traffic if all said direct trunks are busy;

if more than one trunk connects said tandem node to said egress node, routing the traffic from said tandem node to said egress node by randomly distributing the traffic onto any one of the trunks connecting said tandem node to said egress node;

connecting said egress node to said destination by at least one egress trunk or at least one trunk of another network;

notifying said egress node that traffic cannot be routed to said destination when said egress trunk is busy; and wherein upon being notified, said egress node directing the traffic to said destination using another hierarchical level of routing.

2. The method of claim 1, further comprising the step of:

directing the traffic to said at least one trunk of another network connecting said origination node to said egress node if all of the direct trunks connecting said origination node to said egress node and all of the trunks connecting said tandem node to said egress node are busy so that the traffic is routed to said destination by said other network.

3. The method of claim 1, wherein said network switches which form said egress node are in communication with each other; and wherein said destination is connected to said egress node by at least one trunk.

4. The method of claim 3, wherein the capacity to carry traffic for each of said trunks is monitored by a processor of said network.

5. The method of claim 1, wherein said allocation step further comprises the steps of:

collecting statistics data from each switch and trunk of said network for a predefined period; and determining the percentage of calls to be routed to each of said direct trunks in accordance with the capacity reflected in the statistics data collected for each of said switches and trunks to carry traffic.

6. The method of claim 1, wherein said allocation step further comprises the step of:

determining the percentage of calls making up the traffic to each of said switches of said virtual node in a serving area according to the following formula $$\%_a = \frac{\sum\limits_{i=1}^{n}(w_i * I_i^{Sa} * C_i^S)}{\sum\limits_{i=1}^{n}(w_i * I_i^S * C_i^S)} * G \text{ where}$$

n=levels of hierarchy defined for serving area S;

$w_i$=weighting factor of hierarchical level i (may be based on level of hierarchy, cost, or time factors);

$I_i^{Sa}$=Idle trunks in hierarchical level i, on switch a, for serving area S;

$I_i^S$=Idle trunks in hierarchical level i, for serving area S;

$C_i^S$=% of calls carried on hierarchical level i, for serving area S, as calculated by:

$$C_i^S = \max\left(0, \frac{c_i^S}{c_i^S + o_i^S} * \left(1 - \sum_{j=1}^{i-1} C_j^S\right)\right) \text{ where}$$

$C_i^S$=calls carried on hierarchical level i, for serving area S;

$O_i^S$=calls overflowed on hierarchical level i, for serving area S; and

G=Gapping factor (for mass call control).

7. A method of reducing the risk of call traffic not being routed from an origination node to a destination in a telecommunications network due to outages at egress switches of said network, comprising the steps of:

routing a call from an origination node to a first egress switch;

said first egress switch routing the call received from said origination node to said destination if a first trunk connecting said first egress switch to said destination has sufficient capacity to allow the call to be so routed;

routing the call received from said origination node to a tandem node connected to both said first egress switch and said destination via a second trunk so that the call can be routed from said tandem node to said destination if said first trunk does not have sufficient capacity to route the call;

releasing the call back to said origination node if said tandem node is unable to route the call to said destination; and directing the released call to said destination using another hierarchial level of routing.

8. The method of claim 7, wherein said directing step further comprises the steps of:

routing the call to a second egress switch;

routing the call from said second egress switch to either said tandem node or another tandem node if the trunks connecting said second egress switch to said tandem nodes have sufficient capacity to carry the call; and routing the call to said destination.

9. The method of claim 8, further comprising the step of:

routing the call to another network for rerouting to said destination if the call cannot be routed by said second egress switch to said destination.

10. The method of claim 7, wherein said directing step further comprises the steps of:

forming an egress node from a plurality of egress switches;

routing the call to whichever one of said egress switches in said egress node most adaptable to carry the call; and routing the call from said egress node to said destination.

11. The method of claim 7, further comprising the steps of:

collecting statistics data from each switch and trunk of said network for a predefined period; and determining the percentage of calls to be routed to each of said trunks in accordance with the capacity reflected in the statistics data for each of said switches and trunks to carry calls.

12. The method of claim 8, further comprising the step of:

monitoring the amount of calls carried by said trunks and routed by said switches to determine the capacity of said network to carry call traffic.

13. In a telecommunications network, a method of reducing the risk of calls not being routed to their respective destinations due to outages at terminating switches of said network, comprising the steps of:

a) monitoring the capacity to carry call traffic in each of the switches and the trunks interconnecting said switches in said network;

b) storing the respective monitored switch and trunk capacities in a processor, said processor analyzing said capacities to determine how to allocate call traffic among a number of direct trunks interconnecting origination switches and terminating switches;

c) sending an inquiry to said processor to request an optimal route to direct a call to its destination when the call is output from an origination switch, said optimal route including at least one recommended trunk and a recommended terminating switch to which the call output from said origination switch should be routed;

d) sending another inquiry to said processor to request another optimal route to direct the call if either or both of said recommended one trunk and terminating switch do not have the capacity to carry the call; and e) repeating step d until the call is routed to its destination, said processor runs out of route choices, or the number of inquiries exceeds a predetermined count.

14. The method of claim 13, wherein when the call reaches a recommended terminating switch, the method further comprising the steps of:

f) determining if the egress trunk connecting said recommended terminating switch to the destination of the call has sufficient capacity to route the call to the destination; and g) informing said origination switch to route the call to another destination if said egress trunk does not have sufficient capacity.

15. The method of claim 13, wherein the analyzing by said processor of said capacities in step b further comprises the step of:

determining the percentage of calls to be routed to each of said terminating switches in a serving area according to the following formula $$\%_a = \frac{\sum_{i=1}^{n} (w_i * I_i^{Sa} * C_i^S)}{\sum_{i=1}^{n} (w_i * I_i^S * C_i^S)} * G \text{ where}$$

n=levels of hierarchy defined for serving area S;
$w_i$=weighting factor of hierarchical level i (may be based on level of hierarchy, cost, or time factors);
$I_i^{Sa}$=Idle trunks in hierarchical level i, on switch a, for serving area S;
$I_i^S$=Idle trunks in hierarchical level i, for serving area S;
$C_i^S$=% of calls carried on hierarchical level i, for serving area S, as calculated by:

$$C_i^S = \max\left(0, \frac{c_i^S}{c_i^S + o_i^S} * \left(1 - \sum_{j=1}^{i-1} C_j^S\right)\right) \text{ where}$$

$c_i^S$=calls carried on hierarchical level i, for serving area S;
$o_i^S$=calls overflowed on hierarchical level i, for serving area S;
G=Gapping factor (for mass call control).

16. In a telecommunications network, a method of reducing the risk of calls not being routed to their respective destinations due to outages at terminating switches of said network, comprising the steps of:

a) monitoring the capacity to carry call traffic in each of the switches and the trunks interconnecting said switches in said network;

b) storing the respective monitored switch and trunk capacities in a processor, said processor analyzing said capacities to determine how to allocate call traffic among a number of direct trunks interconnecting origination switches and terminating switches;

c) when a call is received at an origination switch, sending an inquiry to said processor to request a route to direct the call to a destination;

d) choosing a route from a list of potential routes received in response to said inquiry from said processor, each of said potential routes including a plurality of terminating switches and at least one trunk connecting each of said terminating switches to said origination switch;

e) using said chosen route to direct the call to said destination via a first terminating switch and said at least one trunk connected thereto from said list;

f) if said at least one trunk connected to said one terminating switch of said chosen route does not have the capacity to carry the call, choosing another termination switch from said list to route the call to said destination;

g) repeating steps d, e and f until either the call is routed to said destination, all of said potential routes of said list are exhausted or the number of inquiries exceeds a predetermined number.

17. The method of claim 16, wherein said list includes additional destinations for routing an incoming call to, and wherein when all of said potential routes are exhausted without the call being routed to said destination, the method further comprising the steps of:

choosing another destination from said list to route the call; and deleting said destination from said list.

18. The method of claim 16, wherein each of said terminating switches is connected to said destination by at least one egress trunk, the method further comprising the steps of:

directing the call to another egress trunk connecting said first terminating switch to said destination to route the call to said destination if the at least one egress trunk connecting said first terminating switch to said destination cannot carry the call; and choosing said another terminating switch to route the call to said destination if all of the trunks connecting said first terminating switch to said destination are busy.

* * * * *